Oct. 9, 1934. A. STOLL 1,975,984
DRIVING COUPLING FOR A ROTARY TOOL
Filed June 4, 1932
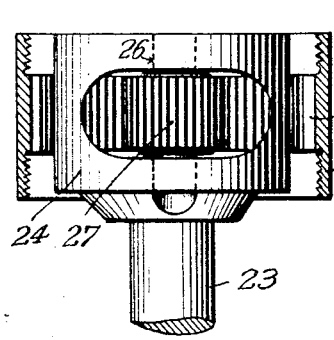
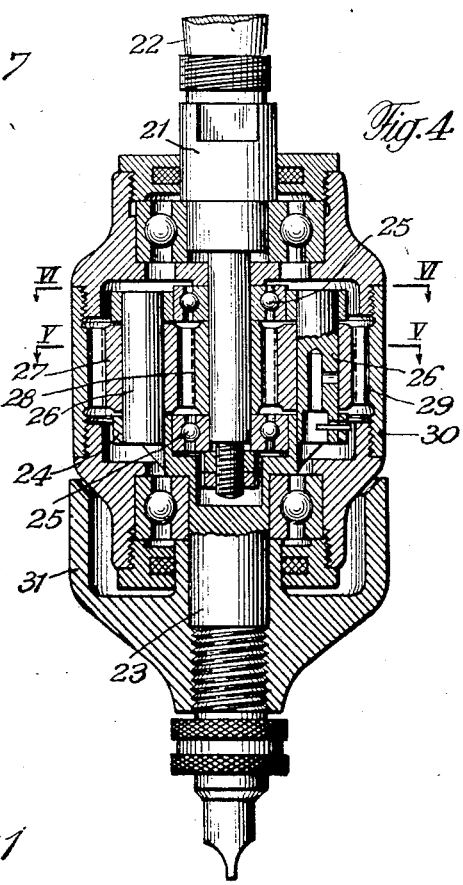
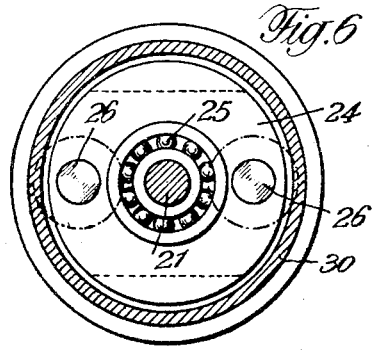
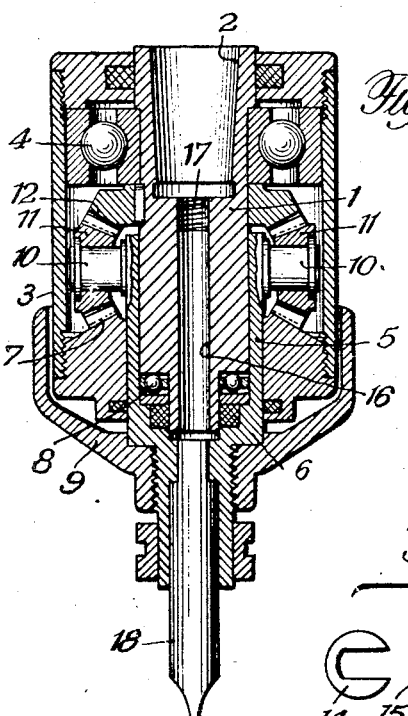
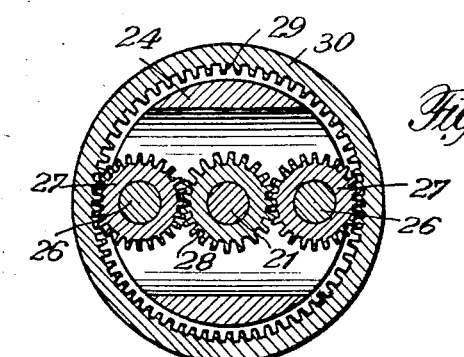
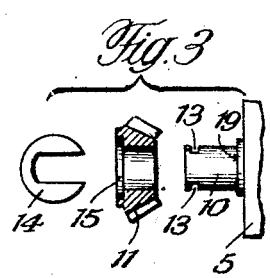
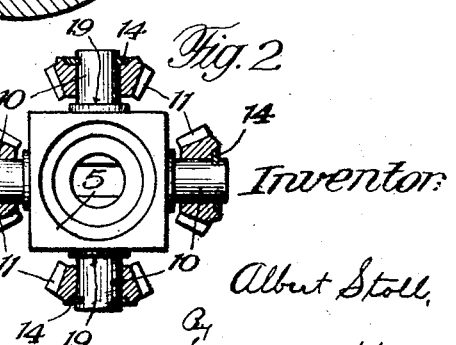
Inventor:
Albert Stoll,
By Sommers + Young
Attys.

Patented Oct. 9, 1934

1,975,984

UNITED STATES PATENT OFFICE 1,975,984

DRIVING COUPLING FOR A ROTARY TOOL

Albert Stoll, Koblenz, Switzerland

Application June 4, 1932, Serial No. 615,401
In Germany June 13, 1931

4 Claims. (Cl. 144—32)

This invention relates to coupling devices between a driving member and a driven member, particularly for driving a rotatable tool from a shaft, wherein between these members a differential gear including gear wheels is intercalated and one of these wheels being secured to a sleeve-shaped part encasing the differential gear, thus enabling the use of this part at the same time as a hand operated braking drum for actuating the driven member on retarding said part.

The object of the invention is to improve on a coupling device of this type by arranging, according to the invention, on the driven member a stop drum of approximately equal diameter to that of a sleeve surrounding the drive gear and serving as a braking member, so that, by shifting the hand from the stop drum to the sleeve, changing over from holding the tool in the inoperative position to applying the braking effect is afforded.

In the accompanying drawing the invention is illustrated by way of example only, in which Fig. 1 is a longitudinal section of one form of the coupling device according to the invention;

Fig. 2 is a sectional top view of the driven member of Fig. 1 with the driven part omitted.

Fig. 3 shows details of the Figs. 1 and 2;

Fig. 4 is a longitudinal section of a second constructional form of the invention;

Fig. 5 is a section on the line V—V in Fig. 4;

Fig. 6 is a section on the line VI—VI in Fig. 4, and

Fig. 7 illustrates a sectional view of the sleeve and an inner cage of the gear of Fig. 4.

Referring particularly to the Figs. 1 to 3 of the drawing, the driving member 1 is provided with an interior conical bore 2 and mounted at one end in a sleeve 3 by means of a ball bearing 4. On the other end of the driving member 1 the socket-shaped end 5 of the driven member 6 is slid. The socket 5 in turn is rotatably mounted in a bevel gear wheel 7 fixed to the sleeve 3. Between the driving member 1 and the driven member 6 a thrust bearing 8 is inserted. A stop drum 9 for arresting the tool is secured to the driven member 6 the diameter of this drum being approximately equal to that of the sleeve 3.

The socket 5 is provided with radially outwardly projecting pins 10 on which the orbit pinions 11 of a differential gear are mounted which pinions mesh on the one hand with the bevel wheel 7 and on the other, with a second bevel wheel 12 fixed to the driving member 1.

The outer ends of the pins 10 are provided with a groove 13 into which a split washer 14 is inserted. The orbit pinions 11 of the differential drive are formed with an enlarged bore portion 15 which corresponds to the diameter of the washer 14. The driving member is provided with an axial bore 16 a portion 17 of which is formed in a screw thread.

The operation of the coupling device is as follows:

When the coupling device is used, for instance, for driving screws, the operator, at first, holds the stop drum 9 fast for inserting the then arrested screw driver 18 in the slot of the screw. Thereupon, he brakes the rotating sleeve 3 by hand, whereafter the screw driver begins to turn by the orbit pinions 11 rolling on the wheel 7 and thus causing the pins 10 to gyrate and thereby the driven member 6 to rotate. By the feeling in the hand operating the brake the operator can readily judge the torque exerted by the screw driver which enables him by reducing the braking action to slow down the screw driver or arrest the same respectively, when he shifts his hand back to the drum 9 to hold it fast.

The relatively long guide provided by the socket 5 for the driving member 1 warrants an accurate centering and great safety against distortion out of alignment of the telescoped driving and driven members.

The thrust bearing 8 transmits the axial thrust exercized by the driven member directly to the driving member, all parts adjacent to said members being thus relieved from axial pressure.

In mounting the pinions 11 of the differential drive they are at first slid on the pins 10 until they contact the shoulder 19 of the latter. Thereupon the split washers 14 are inserted in the grooves 13 between the two shoulders formed thereby, whereafter the pinions are adjusted into their definitely occupied positions in the assembled gear, as shown in the Figs. 1 and 2. In this position of the pinions the washers 14 are entered into the enlarged bore portions of the same, in which manner working loose of the washers is prevented. By the axial thrust subsequently arising in the pinions these are permanently maintained in this position. By screwing a threaded rod not shown into the screw bore 17 from the working end of the coupling the latter is disengaged from the driving shaft of the machine tool to which the device is applied by tightening the rod on the end face of this shaft.

With the constructional form of the device shown in the Figs. 4 to 7 the driving member 21 is provided with a short exterior plug 22 which is adapted to be connected, for example, to the drill head of an electrical drilling machine. The inner end of the driven member 23 is formed as a cage 24 in which the driving member is rotatably guided by means of two spaced ball bearings 25. In this cage also bearing pins 26 for orbit pinions 27 are accommodated with both of their ends. The pinions 27 mesh on the one hand with a spur gear wheel 28 fixed to the driving member 21 and on the other with an interiorly toothed rim 29 connected with a brake sleeve 30. The cage 24 is sufficiently apertured for providing the necessary engagement of the pinions 27 with the toothed rim 29. The driven member 23 is provided with a hand drum 31 of about the same diameter as the sleeve, for arresting said member.

The operation of this constructional form of the invention is the same as above-described. Due to the fact that the diameters of the brake sleeve and the stop drum are almost alike this arrangement permits rotation of the screw driver by merely slidably shifting the hand from the stop drum to the brake sleeve.

Also in this case an accurate centering and great safety against distortion out of alignment of the telescoped members is attained by the double guidance provided for the driving member 21 in the cage of the driven member 23 by means of the two bearings 25.

I claim:

1. In a portable tool holder for rotating tools, in combination, a rotatable drive member and a driven member in telescoped relationship, a tool in rigid connection with said driven member, a socket-shaped inner end portion provided on said driven member and slid on the adjacent end of said drive member to provide a bearing therefor, a thrust bearing inserted between said drive member and said driven member for directly transmitting the axial thrust arising in the latter member to the former, and relieving all parts adjacent to said members from axial pressure, a differential gear intercalated between said drive member and said driven member and adapted to selectively transmit rotational movement of said drive member to said driven member, stationary and orbital gear wheels for said differential gear, a braking sleeve surrounding said differential gear and connected to one of said stationary gear wheels thereof, and a stop drum of approximately the same diameter as said brake sleeve, connected to said driven member, so that the operator may slidingly shift his hand over to said braking sleeve for retarding the same and whereby said driven member may be actuated.

2. In a portable tool holder for rotating tools, in combination, a rotatable axially bored drive member and a driven member, a tool in rigid connection with said driven member, a threaded portion provided in said axial bore of said drive member and adapted for assisting in disengaging said member from the means for rotating the same, a differential gear intercalated between said drive member and said driven member and adapted to selectively transmit rotational movement of said drive member to said driven member, stationary and orbital gear wheels for said differential gear, a braking sleeve surrounding said differential gear and connected to one of said stationary gear wheels thereof, and a stop drum of approximately the same diameter as said brake sleeve, connected to said driven member, so that the operator may slidingly shift his hand over to said braking sleeve for retarding the same and whereby said driven member may be actuated.

3. In a portable tool holder for rotating tools, in combination, a rotatable drive member and a driven member in telescoped relationship, a tool in rigid connection with said driven member, a differential gear intercalated between said drive member and said driven member and adapted to selectively transmit rotational movement of said drive member to said driven member, stationary and orbital gear wheels for said differential gear, a socket-shaped inner end portion provided on said driven member and slid on the adjacent end of said drive member to provide a bearing therefor, radially outwardly projecting bearing pins on said socket-shaped end of said driven member for said orbital gear wheels of said gear, opposite shoulders provided on the exterior end of each bearing pin, a split washer inserted between said opposite shoulders and secured by the respective orbital gear wheel in the definitely occupied position of the same in the assembled differential gear, a braking sleeve surrounding said differential gear and connected to one of said stationary gear wheels thereof, and a stop drum of approximately the same diameter as said brake sleeve, connected to said driven member, so that the operator may slidingly shift his hand over to said braking sleeve for retarding the same and whereby said driven member may be actuated.

4. In a portable tool holder for rotating tools, in combination, a rotatable drive member and a driven member, a tool in rigid connection with said driven member, a differential gear intercalated between said drive member and said driven member and adapted to selectively transmit rotational movement of said drive member to said driven member, stationary and orbital gear wheels for said differential gear, a handling sleeve exteriorly connected to said stationary gear wheel, a handling drum connected to said driven member and having a slightly larger circumference than said handling sleeve, said sleeve and said drum affording guidance for the hand of the operator for simultaneously holding the device and controlling the relative rotation of these parts.

ALBERT STOLL.